United States Patent [19]

Suzuki et al.

[11] 4,333,720
[45] Jun. 8, 1982

[54] STOP CONTROL DEVICE

[75] Inventors: Ryoichi Suzuki, Kawasaki; Takashi Uchiyama, Yokohama, both of Japan

[73] Assignee: Canon Kabushiki Kaisha, Tokyo, Japan

[21] Appl. No.: 158,463

[22] Filed: Jun. 11, 1980

[30] Foreign Application Priority Data

Jun. 14, 1979 [JP] Japan .................................. 54-74799

[51] Int. Cl.³ ................................................ G03B 9/56
[52] U.S. Cl. ................................................ 354/227
[58] Field of Search ..................................... 354/227

[56] References Cited

U.S. PATENT DOCUMENTS

| | | | |
|---|---|---|---|
| 3,476,029 | 11/1969 | Schreckendgust | 354/227 |
| 3,955,208 | 5/1976 | Wick et al. | 354/227 |
| 4,054,890 | 10/1977 | Shimomura | 354/227 |
| 4,218,120 | 8/1980 | Kawamura et al. | 354/227 |
| 4,251,141 | 2/1981 | Stemme et al. | 354/227 |

*Primary Examiner*—Russell E. Adams
*Attorney, Agent, or Firm*—Toren, McGeady & Stanger

[57] ABSTRACT

A stop device of the type using a physical property member which is arranged to have its light transmission factor variable and to form a light shielding part and a light transmitting part for effecting adjustment of an aperture value by adjusting the area of the light transmitting part. The area of the light transmitting part for each stopping step of the aperture is determined in relation to the light shielding part and the light transmission factor of the light transmitting part to obtain an effective T number.

5 Claims, 14 Drawing Figures

STOP CONTROL DEVICE

BACKGROUND OF THE INVENTION

1. Field of the Invention

This invention relates to an optical stop device of the type arranged to adjust the quantity of light passing through an optical system, and more particularly to a stop device for a camera or the like having a physical property member which is arranged to have its light transmission factor varied in response to an electric or magnetic field impressed thereon.

2. Description of the Prior Art

In the past, a mechanical stop device has generally been disposed in the optical system of a camera for adjustment of light quantity. A mechanical stop device necessitates the use of a mechanical mechanism for its operation. Particularly, in a camera adapted for use with an interchangeable lens, a mechanical stop device necessitates a complex coupling mechanism to provide a linkage between the stop mechanism of the interchangeable lens and the camera body. This necessity has caused an increase in the cost of such camera, an increase in its size, and has restricted the latitude allowed for the design of the camera.

However, use of an electrically or magnetically controllable stop device permits the complex stop control mechanism between the camera and the lens to be replaced with a simple arrangement to transmit signals through electrical contacts, and such a stop device is advantageous for a camera adapted for use with an interchangeable lens. Therefore, there have been proposed various stop devices of the type using an electro- or magneto-optical element that has a light transmission factor which changes with impression of an electric or magnetic field thereon. Known electro- or magneto-optical elements of this kind include Kerr cells utilizing a double refraction phenomenon, transparent strong dielectrics (PLZT), liquid crystals and Farady elements. It has been known to obtain devices for adjusting the quantity of transmitted light by combining such an element with a polarizer and an analyzer. In addition to these elements, there also are known electrochrome elements and elements that utilize the phenomenon of electrophoresis.

A physical property stop device using such an element has many advantages that cannot be found in the conventional mechanical stops. A salient advantage of such a device lies in the fact that it dispenses with a mechanical coupling or linkage mechanism. This permits reduction of size and weight and thus allows a greater latitude in designing a camera. Another advantage is that the absence of mechanical operating parts eliminates the shock and noise that are otherwise produced during a stopping operation. Therefore, the photographer is relieved of any disagreeable feeling. A stopping down action on the lens also can be readily confirmed by a switch operation. Besides, since a physical property stop is controllable with an electric circuit, it well meets the recent trend of applying electronics to cameras, and can be a great step toward the full application of electronics to cameras.

The aperture controlling methods of physical stops include an area control method in which the light transmission factor is controlled by varying the area of the aperture such as in a mechanical iris stop, and a light transmission factor controlling method in which the light transmission factor is controlled by varying an impression voltage or a magnetomotive force. In the latter method, the curve of the light transmission factor relative to the impressed voltage or the magnetomotive force, on the electro- or magneto-optical element, is too steep for fine adjustment of the light transmission factor. Besides, the light transmission factor varies with variation of temperature, etc. The latter method, therefore, is less practicable than the former. Further, in the latter case, it is impossible to utilize the variation in the depth of focus resulting from the effect of stopping. In view of these shortcomings of the latter method, the former, i.e. the area control method, has been mainly proposed for a physical property stop.

The stop of a lens which uses such a physical property member has a unique feature that is not found in the conventional mechanical stop. In other words, it is impossible with the capability of the current technology to make the maximum and minimum light transmission factors of the electro- or magneto-optical element 100% and 0% as in the case of the mechanical stop that uses an opaque material. In the presently known electro- or magneto-optical elements, the light transmission factor cannot be made to be 0% with electricity or magnetism impressed thereon to obtain a light shielding condition, because of a slight degree of light leakage and, in the light transmitting condition, a slight degree of attenuation of light is inevitable. These characteristics are inevitable because such light shielding and transmitting conditions are not brought about by moving an opaque material, but are brought about by merely utilizing the properties of the element in terms of solid- or liquid-state physics. In the use of a stop device for exposure control of a camera, however, this presents a serious problem.

Unlike the conventional mechanical stop which has a 0% light transmission factor in its light shielding part, a physical property stop of the area control type has a slight light leakage from its light shielding part as mentioned in the foregoing. Therefore, if the stopping area of the physical property stop are set in an equal multiplicative sequence in the same manner as in a mechanical stop, the effective T number (corresponding to the quantity of light received through the lens and the stop) at each stop aperture value would tend to deviate from the equal multiplicative sequence, and thus would become incompatible with the APEX computation system of the conventional camera. Then, in the case of a TTL camera of the type which measures light through a full-open lens and obtains shutter time information by introducing aperture information into a computation circuit, this incompatibility tends to cause an exposure error. To solve this problem, it is conceivable to combine a mechanical light shielding means with the physical property element, and to control the point of time at which the mechanical light shielding means operates in such a manner as disclosed, for example in DOLS 2541678. However, such a method not only requires the use of the mechanical light shielding means but also necessitates control over the point of time at which the light shielding means is to be operated. Such a method thus necessitates a complex control arrangement.

SUMMARY OF THE INVENTION

The present invention is directed to the solution of the above stated problems. It is therefore a general object of the invention to provide a physical property stop device having a physical property stop of the area control type and is capable of performing accurate exposure control by setting the areas of stop apertures in such a way as to have the effective T number thereof arranged in an equal multiplicative sequence. To attain this object, an aperture area obtainable at each stopping step is determined in accordance with the light transmission factors of a physical property member, in a physical property stop of the area control type, in its light shielding and light transmitting conditions to have the effective T numbers arranged in an equal multiplicative sequence for accurate exposure control.

It is another object of the invention to provide a physical property stop device of the area control type in which the effective T numbers, obtained at the stopping steps, are arranged to be in an equal multiplicative sequence by controlling the aperture area at each of the stopping steps in accordance with the formula $$Sn + 1 = \frac{1}{2}\left(Sn - \frac{\alpha}{\alpha_{TR} - \alpha_{OP}} \cdot S_o\right)$$

wherein $\alpha_{TR}$ represents the light transmission factor of a physical property member in its light transmission state; $\alpha_{OP}$ represents that of the physical property member in its light shielding state; $S_o$ represents the maximum (or full open) aperture of an optical system; and $Sn$ and $Sn+1$ represent the aperture areas obtainable for adjoining stopping steps in the stop device of the area control type.

These and further objects, features and advantages of the invention will become apparent from the following detailed description of preferred embodiments thereof taken in connection with the accompanying drawings.

BRIEF DESCRIPTION OF THE DRAWINGS

FIGS. 2(1) and 2(2) are illustrations of the apertures and structural arrangement of the physical property stops of the present invention, FIG. 2(1) representing a stop in which $\alpha_{TR}=0.3$ and $\alpha_{OP}=0.001$ and FIG. 2(2) a stop in which $\alpha_{TR}=0.3$ and $\alpha_{OP}=0.01$.

FIGS. 4(1) and 4(2) are illustrations of stop patterns of the physical property stop which form other embodiments of the invention.

FIGS. 5(1) and 5(2) are a plan view and a sectional view showing the physical property stop in FIG. 2.

DETAILED DESCRIPTION OF THE PREFERRED EMBODIMENTS

Figure 1:
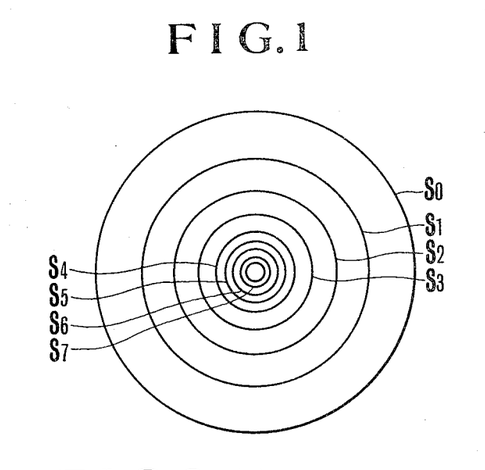
FIG. 1 is an illustration of the aperture areas obtainable at each stopping step of a circular stop as an example of an area control method using a physical property stop.

Before describing the physical property stop device of the present invention, the required aperture value, for each stopping step, to arrange the effective T numbers in an equal multiplicative sequence with an area control type of physical property stop will now be explained. Referring to FIG. 1, which shows each of the stop apertures obtained by stopping down the aperture of a circular stop starting from its full open side, the stopped aperture area are indicated by symbols $S_o$, $S_1$, $S_2$, $S_3$... one after another from the full open side.

Assuming that the light transmission factor obtained with the physical property stop in a light transmitting state thereof is $\alpha_{TR}$ ($\times 100\%$), the light transmission factor obtained with the stop in a light shielding state is $\alpha_{OP}$ ($\times 100\%$), and the quantity of light incident upon the stop is $Ii$, the quantity of transmission light $I_0$ which is obtained with the stop in its full open state can be expressed by:

$$I_o = Ii \alpha_{TR} S_o \quad (1)$$

Next, a transmission light quantity $I_1$, which is obtained with the aperture stopped down to the aperture area $S_1$, is the sum of the transmission light quantity at the aperture area $S_1$ and the quantity of the light leakage which takes place from the light shielding part $S_o - S_1$. Therefore, there obtains the followin relation:

$$I_1 = Ii\,[\alpha_{TR} S_1 + \alpha_{OP}(S_o - S_1)] \quad (2)$$

With this generalized, the transmission light quantities $In$ and $In+1$ obtained when the aperture of the stop is stopped down from the full open state to the area $Sn$ and to another area $Sn+1$ can be expressed respectively by the following formulas:

$$In = Ii\,[\alpha_{TR} Sn + \alpha_{OP}(S_o - Sn)] \quad (3)$$

$$In+1 = Ii\,[\alpha_{TR} Sn+1 + \alpha_{OP}(S_o - Sn+1)] \quad (4)$$

In order to have the effective T numbers arranged to be in an equal multiplicative sequence, the above stated $In+1$ must be $\frac{1}{2}$ of $In$ as shown below:

$$In+1 = \tfrac{1}{2} In \quad (5)$$

Then, with the formulas (3) and (4) substituted for the following formula (5) for rearrangement, there obtains the following relation:

$$Sn - 2Sn + 1 = \frac{\alpha_{OP}}{\alpha_{TR} - \alpha_{OP}} S_o \quad (6)$$

Assuming that the aperture areas $Sn$, $Sn+1$ and $S_o$ shown in FIG. 1 are of diameters $Dn$, $Dn+1$ and $D_o$, respectively, they can be expressed by:

$$Sn = \frac{\pi Dn^2}{4},\ Sn+1 = \frac{\pi Dn+1^2}{4},\ S_o = \frac{\pi D_o^2}{4} \quad (7)$$

With the formula (7) substituted for the formula (6) for rearrangement, the following formula is derived from the formula (6):

$$Dn + 1 = \frac{1}{\sqrt{2}} \sqrt{Dn^2 - \frac{\alpha_{OP}}{\alpha_{TR} - \alpha_{OP}} \cdot D_o^2} \quad (8)$$

As apparent from the formula (8) above, a physical property stop aperture of the area control type is strongly dependent on the light transmission factor $\alpha_{TR}$ obtained when an electro- or magneto-optical element used for the physical property stop is turned on (in the light transmitting state), and on the light transmission factor $\alpha_{OP}$ obtained when the element is turned off (in the light shielding state). In other words, in order to arrange a physical property stop to have an equal multiplicative sequence of T numbers depressed by $Sn+1=\tfrac{1}{2}$ Sn in the case of a mechanical stop, it is necessary to have the aperture of the physical property stop stopped down to a greater extent by $$\frac{1}{2} \cdot \frac{\alpha_{OP}}{\alpha_{TR} - \alpha_{OP}} S_o$$

In the stop device prepared in accordance with the present invention, the opening area of, or the aperture of the stop, is computed from the above formula (6) or (8) in accordance with the $\alpha_{TR}$ and $\alpha_{OP}$ of the electro- or magneto-optical element to be used; and then the area of the opening or aperture of the physical property stop is determined in accordance with the computed value thus obtained.

TABLE 1(1)

$\alpha_{TR} \times 100 = 30\%$ f = 50 mm, F = 1.4

| $\alpha_{OP} \times 100$ | 0% | 0.1% | 1.0% | 10.0% (in mm) |
|---|---|---|---|---|
| Stop aperture ↓ Small | 35.36 | 35.36 | 35.36 | 35.36 |
| | 25.00 | 24.96 | 24.57 | 17.68 |
| | 17.68 | 17.59 | 16.74 | |
| | 12.50 | 12.35 | 10.89 | |
| | 8.84 | 8.62 | 6.14 | |
| | 6.25 | 5.92 | | |
| | 4.42 | 3.93 | | |
| | 3.13 | 2.37 | | |
| | 2.21 | 0.85 | | |

TABLE 1(2)

$\alpha_{TR} \times 100 = 50\%$ f = 50 mm, F = 1.4

| $\alpha_{OP} \times 100$ | 0% | 0.1% | 1.0% | 10.0% (in mm) |
|---|---|---|---|---|
| Stop aperture ↓ Small | 35.36 | 35.36 | 35.36 | 35.36 |
| | 25.00 | 24.98 | 24.75 | 21.65 |
| | 17.68 | 17.63 | 17.13 | 8.84 |
| | 12.50 | 12.41 | 11.57 | |
| | 8.84 | 8.71 | 7.36 | |
| | 6.25 | 6.05 | 3.79 | |
| | 4.42 | 4.13 | | |
| | 3.13 | 2.70 | | |
| | 2.21 | 1.55 | | |

Tables 1(1) and 1(2) show stop aperture values of a lens of focal length 50 mm and full open F number 1.4 with the physical property stop used for the lens, the aperture values being obtained at different $\alpha_{TR}$ and $\alpha_{OP}$ values. Table 1(1) shows the stop aperture values obtained when the value of $\alpha_{TR}$ is 0.3 (or 30%) while Table 1(2) shows the stop aperture values obtained when $\alpha_{TR}$ is 0.5 (or 50%) with $\alpha_{OP}$ used as parameter.

In these tables, the stop aperture values shown are the same as the conventional mechanical stop aperture values which are arranged in an equal multiplicative sequence of areas. As apparent from the tables, if the light transmission factor $\alpha_{TR}$ which is obtained when the electro- or magneto-optical element is on is unchanged, it is necessary to correct the stop aperture to a greater extent in proportion to increase in the transmission factor $\alpha_{OP}$, which is obtained when the element is off.

Figure 2:
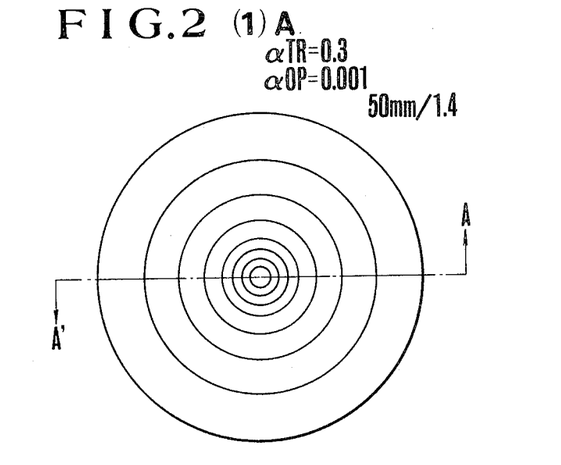

FIGS. 2(1) and 2(2) concretely show the sizes of the stop apertures. In FIG. 2(1), $\alpha_{TR}$ is 0.3 and $\alpha_{OP}$ is 0.001, while in FIG. 2(2) $\alpha_{TR}$ is 0.3 and $\alpha_{OP}$ is 0.01. The structural arrangement of each of the physical property stops is as shown in the lower parts of these drawings. In the case of FIG. 2, liquid crystals are employed as electro-optical elements.

Referring to FIG. 2, each of the physical property stops comprises transparent glass base plates 1 and 2; a circular or doughnut shaped divided transparent electrode arrangement 3a 3h ~ or 3a' ~ 3e' which is formed on one of the transparent base plates 1 by a vacuum evaporation process or the like; a transparent common electrode 4 which is formed on the other transparent base plate 2; nematic liquid crystal matter 5 which is sealed up between the two transparent base plates and is oriented in a twist mode; separators 8 and 9 which are arranged not only to keep a spacing distance between the two transparent base plates 1 and 2 but also to prevent the nematic liquid crystal matter 5 from flowing out; and polarizing plates 6 and 7 which are disposed on the outsides of the transparent base plates with their polarizing directions arranged at an angle of 90° to each other.

The nematic liquid crystal matter 5 which is oriented into a twist mode acts to rotatively polarize 90 degrees the polarization direction of a polarized incident light when no voltage is impressed. Therefore, the polarized light which passes through the polarizing plate 6 has its polarization direction turned 90 degrees while it passes through the nematic liquid crystal matter 5 and is thus enabled to pass through the other polarizing plate 7. Therefore, when no voltage is impressed, the physical property stop is in a light transmitting state.

Next, when an AC voltage is impressed between the common transparent electrode and a selected transparent divided electrode, the oriented state of the nematic liquid crystal matter, which is interposed between these electrodes in the twist mode, collapses, and its rotationally polarizing effect disappears. Then, the polarized light incident upon the nematic liquid crystal matter 5 passes therethrough without having its polarized direction rotated, and thus is blocked by the other polarizing plate 7 at the next stage. Accordingly, the physical property stop is brought into a light shielding state when a voltage is impressed thereon. A predetermined aperture value thus can be obtained by impressing an AC voltage on one of the divided transparent electrodes selected in accordance with the aperture information transmitted from the camera. The aperture values of the physical property stop shown in FIG. 2 are determined in accordance with the formula (8) given above.

Figure 3:
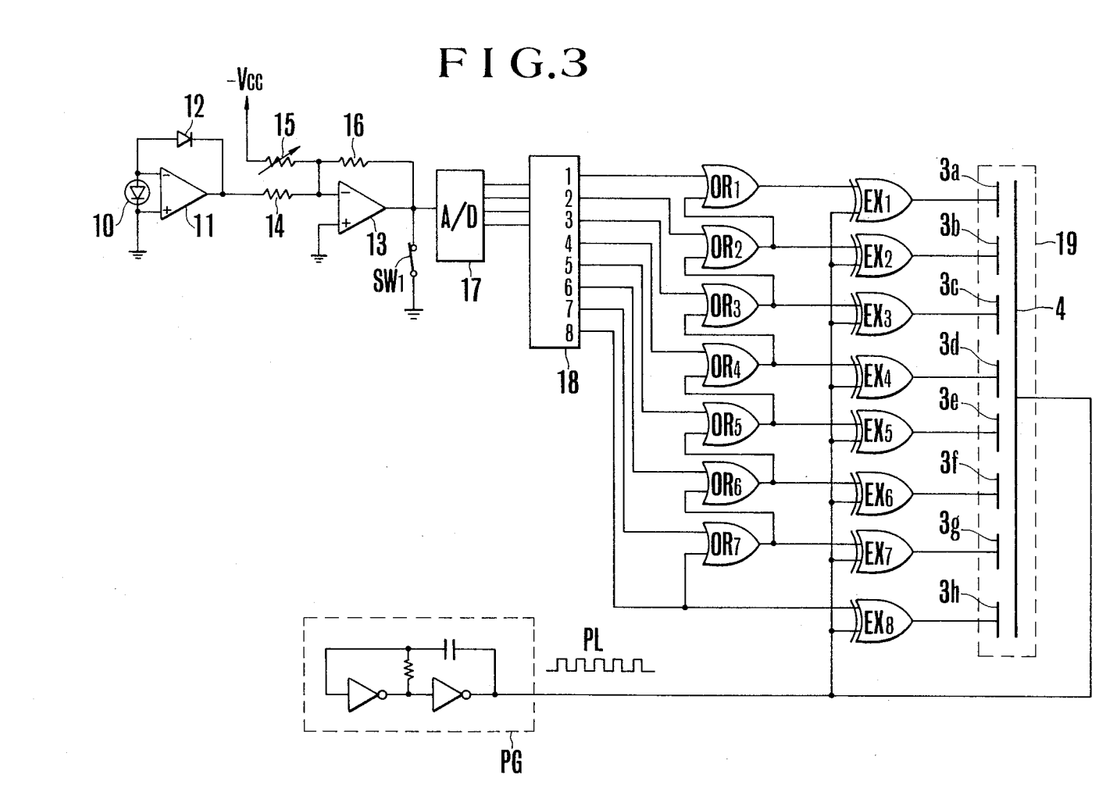
FIG. 3 is a circuit diagram showing a driving circuit of the physical property stop by way of example.

FIG. 3 shows a driving circuit for the physical property stop shown in FIG. 2(1). This circuit is adapted for application to an automatic exposure single-lens reflux camera of the shutter preference type. Referring to FIG. 3, there are provided a photovoltaic element 10 (SPC) which performs a light measurement through the lens with the lens full open; an operational amplifier 11 which forms an SPC head amplifier and has the element (SPC) 10 connected to the two input terminals thereof while a diode 12 for logarithmic suppression is connected to the negative feedback route of the operational amplifier 11; an operational amplifier 13 (hereinafter called OP amplifier for short) which forms a summing circuit and has its inversion input terminal connected to the output terminal of the OP amplifier 11 through a resistor 14 while its inversion input terminal is also connected to a negative power source −Vcc through an information inut resistor 15 arranged for receiving on a preset shutter speed, the ASA sensitivity of the film used, etc.; a resistor 16 which is inserted in the negative feedback route of the OP amplifier 13; an A-D converter 17 which is connected to the output terminal of the OP amplifier 13 and is arranged to convert an input analog signal voltage into a binary code of four bits; and a decoder 18 which is connected to the output terminals of the A-D converter 17 and is arranged to convert the binary code of four bits received from the converter 17 into a decimal code.

The outputs 1~7 of the decoder 18 are supplied to one input terminal of each of OR gates OR1~OR7 which have two input terminals, respectively. The other input terminal of each of the OR gates OR1-~OR6 is arranged to receive the output of each of the OR gates OR2~OR7 while the output 8 of the decoder 18 is supplied to the other input terminal of the OR gate OR7.

There are provided two input type exclusive OR gates EX1~EX8. One input terminal of each of the exclusive OR gates EX1~EX7 is arranged to be supplied with each of the outputs of the OR gates ORL-~OR7 while one input terminal of the exclusive OR gate EX8 is arranged to be supplied with the output 8 of the decoder 18. The other input terminal of each of the exclusive OR gates EX1~EX8 is arranged to be supplied with the output of a pulse generating circuit PG which is composed of an inversion circuit. A normally closed switch SW1 is disposed between the output terminal of the OP amplifier 13 and ground, and is arranged to be open only during a shutter operation. A reference numeral 19 indicates the physical property stop which is shown in FIG. 2(1) and which is provided with circular or doughnut shaped divided transparent electrodes $3a$~$3h$ connected to the output terminals of the exclusive OR gates EX1~EX8, and also with a common transparent electrode 4 which is connected to the output terminal of the pulse generating circuit PG.

The circuit which is arranged as described in the foregoing operates as follows:

When light coming from an object to be photographed passes through a photograph taking lens (not shown) and comes to the light measuring SPC element 10, a voltage corresponding to the logarithm of the brightness of the object and the full open T number of the photograph taking lens is produced at the output terminal of the SPC head amplifier 11. The summing circuit 13 at the next stage performs a summing operation by adding this voltage to information on the preset shutter speed and the ASA sensitivity of the film. Then, at the output terminal of the summing circuit 13, there is produced a voltage corresponding to information on the number of stopping down steps $\Delta AV$ to which the stop should be adjusted. The voltage thus obtained is converted into a binary code of four bits by the A/D converter 17 at the next stage. The binary code is further converted into a decimal code by the decoder 18 at the next stage. Then, one of the outputs of the decoder 18 is selectively caused to be of a high level (hereinafter called an H level) in accordance with the analog output voltage of the OP amplifier 13.

Assuming now that, among the outputs of the decoder 18, the output 1 of the decoder is selected to cause the level thereof to become an H level, other outputs of the decoder 18 are at a low level (hereinafter called L level). This causes only one input to the OR gate OR1 to be at an H level while all the other inputs to the OR gates OR2~OR7 are brought to an L level. Accordingly, it is only the output of the OR gate OR1 that becomes an H level while the outputs of the OR gates OR2~OR7 are brought to an L level.

Then, the exclusive OR gate EX1 produces pulses of opposite phase to the pulse PL produced by the pulse generating circuit PG, and the exclusive OR gates EX2-~EX8 produce pulses of the same phase as the pulses PL. Under this condition, an effective AC voltage is impressed only on the part between the divided transparent electrode $3a$ and the common transparent electrode 4 to bring this part alone into a light shielding state. The aperture of the stop is thus stopped down by one step under this condition.

Next, when the output 4 among others of the decoder 18 is selected to make its level high, the level of one input to the OR gate OR4 becomes high and, accordingly, the level of the output of the OR gate OR4 also becomes high. This in turn causes the level of one input to the OR gate OR3 to become high and the level of the output of the gate OR3 also becomes high. In this manner, the levels of the outputs of the OR gates OR2 and OR1 also become high one by one. In other words, the levels of the outputs of the OR gates OR1~OR4 become high while the levels of the outputs of the OR gates OR5~OR7 are low. Therefore, the output pulses of the exclusive OR gates EX1~EX4 are brought to be of opposite relative to the pulses PL, while the output pulses of the exclusive OR gates EX5~EX8 are at the same phase as that of the pulses PL. Under this condition, an effective AC voltage is impressed on the part between the common transparent electrode 4 and the divided transparent electrodes $3a$~$3d$. Then this part is in a light shielding state to bring the aperture of the stop into the state of being stopped down by four steps.

The stop control is performed as described in the foregoing. With the circuit provided with the switch SW1 arranged to be normally closed, except when the shutter is in operation, the stop control is performed only during the shutter operation. With this exception, the stop is left in a full open state to keep the inside of the viewfinder of a single-lens reflex camera sufficiently bright for composition of a picture of an object to be photographed.

Further, provision of an operating member for the above stated switch SW1 on the outside of the camera body enables the photographer to readily confirm the stopped down state of the aperture by opening the switch. In the physical property stop device shown in FIG. 2, the circular divided transparent electrode $3h$ is not necessary for the operation of the stop device. However, with this electrode provided, the whole face of the stop can be brought into a light shielding state also to permit its use as a physical property shutter.

Figure 4:
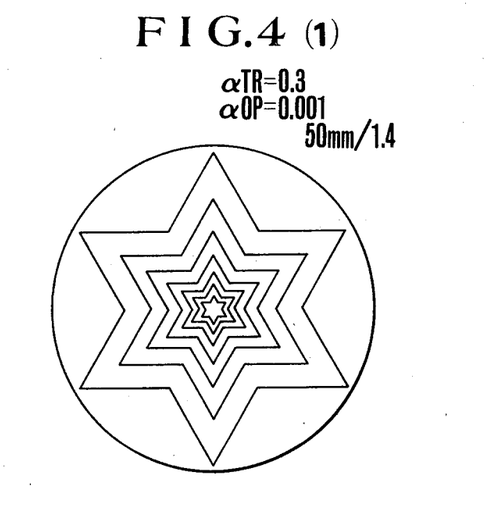

FIG. 4 shows concrete stop patterns of the stops as further embodiments of the invention, wherein star-shaped stops are employed. The use of such star-shaped stops gives an advantage of preventing the resolving power from degrading when the aperture is stopped down to a slight degree. The star-shaped stops shown in FIG. 4 are designed for use in a lens of focal length 50 mm and full-open F number 1.4 like in the case of FIG. 2. In the stop device shown in FIG. 4(1), the value $a_{TR}$ is 0.3 and the value $a_{OP}$ is 0.001 while, in the case of FIG. 4(2), the value $a_{TR}$ is 0.3 and that of $a_{OP}$ is 0.01.

Figure 5:
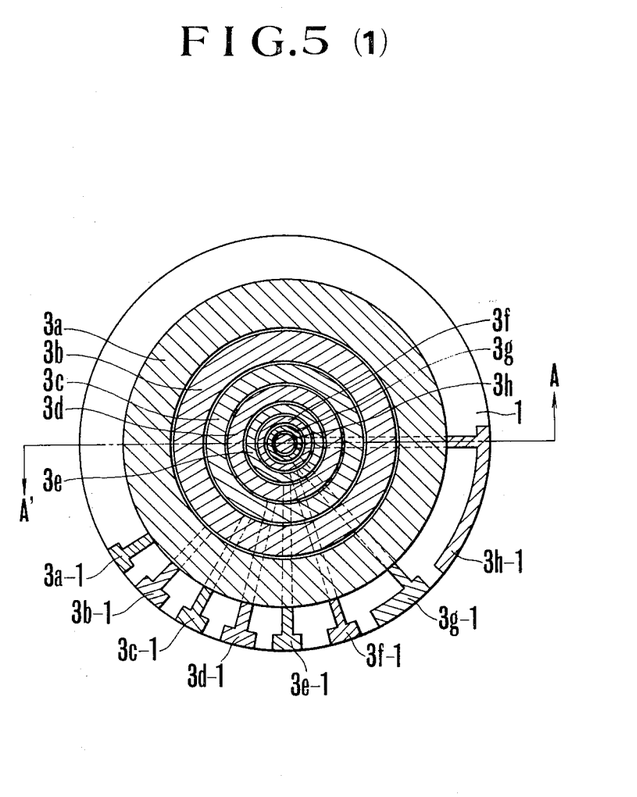

FIG. 5 shows a concrete structural arrangement of the divided transparent electrodes $3a$~$3h$ shown in FIG. 2. In FIG. 5(1), there are shown a transparent glass base plate 1; circular or doughnut-shaped divided transparent electrodes $3a$~$3h$; and drawing-out electrodes $3a1$~$3h$-1 which are connected to the corresponding divided transparent electrodes respectively, and are provided for connection to a driving circuit. The drawn out arrangement of the drawing-out electrodes is as shown in FIG. 5(2) which is a sectional view taken on line A-A' shown in FIG. 5(1). Referring now to FIG. 5(2), the drawing-out electrode 3h-1 is for the divided transparent electrode 3h and is insulated and separated from other divided transparent electrodes 3a~3g by a transparent insulation layer 20. Other drawing-out electrodes are also arranged in the same manner as the electrode 3h-1. Such being the structural arrangement, the physical property stop is provided with an ideal arrangement of electrodes without the fear of losing a part of the divided transparent electrode due to the drawing-out electrode, or having the drawing-out electrode come into electrical contact with other divided transparent electrodes.

Figure 6:
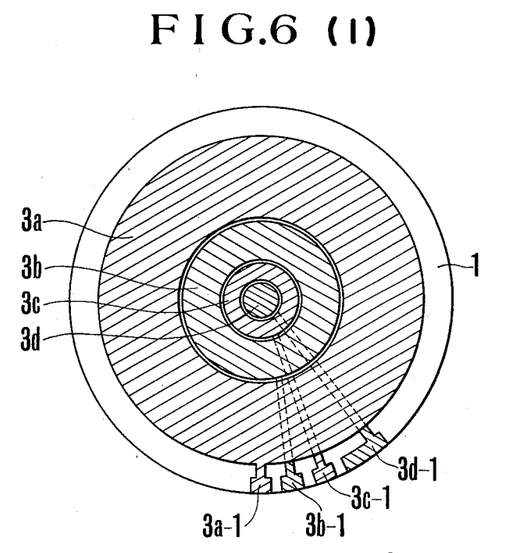
FIG. 6 includes plan views and a sectional view showing another embodiments of the invention.

While, in the embodiment shown in FIG. 2 or FIG. 5, only the divided transparent electrodes disposed on one of the two transparent base plates are divided in accordance with the stop aperture values, FIG. 6 shows another embodiment in which the transparent electrodes disposed on both of the transparent base plates are divided. In this embodiment, the electrodes are arranged to give stop aperture values required where the value $\alpha_{TR}$ is 0.3 and $\alpha_{OP}$ is 0.001.

In FIG. 6, there are shown transparent glass base plates 1 and 2; divided transparent electrodes 3a~3d which are formed on the transparent glass base plate 1; divided transparent electrodes 4a~4e which are formed on the other transparent glass base plate 2; drawing-out electrodes 3a-1~3d-1 and 4a-1~4e-1 which are arranged for the divided transparent electrodes 3a~3d and 3a~4e in the same manner as shown in the case of FIG. 5; polarizing plates 6 and 7; and spacers 8 and 9.

To stop down the aperture by one step, pulses of opposite phase are impressed between the divided transparent electrode 3a and the corresponding divided drawing-out electrode 4a while pulses of the same phase are impressed between the electrodes 3a and 4b and between other divided upper and lower transparent electrodes. To stop down the aperture by two steps, pulses of opposite phases are impressed between the electrodes 3a and 4a and between the electrodes 3a and 4b while pulses of the same phase are impressed on parts between the electrodes 3b and 4b and also between other divided upper and lower transparent electrodes. In this manner, the aperture can be stopped down further.

As described in the foregoing, a desired stop aperture can be obtained by controlling the phase of the pulse voltage applied to each of the divided transparent electrodes through a driving circuit, by utilizing the fact that a light shielding state occurs at a part where pulses of opposite phase are impressed between the upper and lower divided transparent electrodes.

Figure 7:
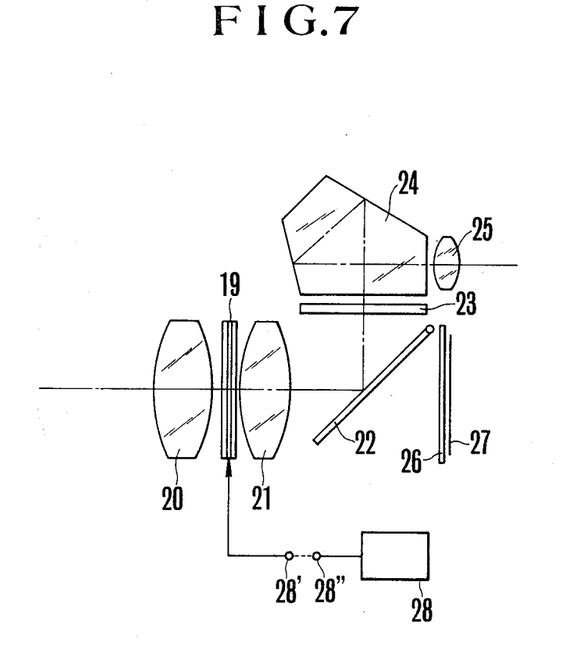
FIG. 7 is a schematic illustration of an embodiment of the invention in a single-lens reflex camera.

FIG. 7 shows a physical property shutter in accordance with the present invention as included in a single-lens reflex camera. There are provided a photograph taking lens system 20 and 21; a physical property stop 19 as described above which is located on a plane of a principal point; a reflection mirror 22 which is arranged for quick return movement; a reticle 23; a pentagonal prism; an eyepiece lens 25; a focal plane shutter 26; a film 27; and the driving circuit for the physical property stop shown in FIG. 3. A driving circuit 28, as described above, is disposed within the camera body. In the case where the photograph taking lens is an interchangeable lens, there are provided contact pieces 28' and 28'' both on the side of the interchangeable lens and on the side of the camera body, respectively, for effecting electrical connection between the physical property stop 19 and the driving circuit 28 which is disposed on the side of the camera body.

While the embodiments of the invention have been described in the foregoing as using liquid crystal matter as an electro-optical element, the present invention is not limited to such arrangement and the liquid crystal matter may be replaced with any other elctro- or magneto-optical element. Further, the configuration of the physical property stop is also not limited to a circular or star shape, but any other shape may be employed as long as the optical performance thereof is satisfactory. Also, it is not always necessary to stop down the aperture starting from the full open side of the stop, but the aperture may be stopped down in any other suitable manner, such as stopping down starting from the middle part thereof. The manner in which the aperture is to be stopped down may be selected as desired out of the most suitable methods in terms of optical performance. In cases where the aperture is to be stopped down in a manner not starting from the full open side, however, the stop aperture values must be determined also to have the effective T numbers in an equal multiplicative sequence based on a formula that is similar to the above formulas (6) and (8).

In the embodiment examples given in the foregoing, the value of TR is 0.3. However, the stop aperture values can be determined for other values of $\alpha_{TR}$ in accordance with the formula (8) or a formula similar thereto. Further, in the embodiments, the aperture is arranged to be stopped down by one step. However, the aperture may be easily arranged to be stopped down also to intermediate steps such as by $\frac{1}{3}$ or $\frac{1}{2}$ step instead of by one step. Many modifications and variations of the invention are possible as long as the stop aperture areas of the physical property stop are set to have effective T numbers arranged in an equal multiplicative sequence.

As mentioned in detail through the foregoing description of certain embodiments, the present invention provides a physical property stop which is compatible with the APEX computation method of conventional cameras and eliminates the fear of exposure errors. Therefore, the stop device of the invention has a great advantage for practical applications.

What is claimed is:

1. A camera stop device having a controllable stop aperture so that a quantity of light corresponding to an effective T number can be selected to pass through the device, comprising:
    (a) stop means including a physical property member responsive to a control signal to provide a variable light transmission factor, said member being arranged to form a light transmitting part of a first area and a light shielding part of a second area according to the values of said light transmission factor for said light transmitting part and said light shielding part; and
    (b) a control circuit coupled to said physical property member for providing said control signal to select said first and said second areas according to a number of stopping steps wherein the stop aperture corresponding to each stopping step is determined by the selected first area of said light transmitting part, said selected first area being determined in such a manner that the effective T number for each stopping step does not deviate from the equal multiplicative sequence.

2. A camera stop devices having a controllable stop aperture so that a quantity of light corresponding to an effective T number can be selected to pass through the device, comprising:
 (a) stop means including a physical property member responsive to a control signal to provide a variable light transmission factor, said member being arranged to form a light transmitting part of a first area and a light shielding part of second area according to the values of said light transmission factor for said light transmitting part and said light shielding part; and
 (b) a control circuit coupled to said physical property member for providing said control signal to select said first and said second areas according to a number of stopping steps wherein the stop aperture corresponding to each stopping step is determined by the selected first area of said light transmitting part, said selected first area being determined so that the effective T number for each stopping step aligns in the equal multiplicative sequence, in accordance with $$Sn + 1 = \tfrac{1}{2}\left(Sn - \frac{\alpha_{OP}}{\alpha_{TR} - \alpha_{OP}} \cdot S_o\right)$$

wherein $S_o$ represents the area of the light transmitting part when the aperture is fully open; $Sn$ and $Sn+1$ represent the areas of the light transmitting parts for adjoining stopping steps; $\alpha_{TR}$ represents the light transmission factor of the light transmitting part of said physical property member; and $\alpha_{OP}$ represents the light transmission factor of the light shielding part of the physical property member.

3. A camera stop device having a controllable stop aperture so that a quantity of light corresponding to an effective T number can be selected to pass through the device, comprising:
 (a) stop means for providing the stop aperture at each of a number of stopping means, including:
  (1) a first transparent base plate;
  (2) a second transparent base plate;
  (3) a physical property member interposed between said first and said second transparent base plates, said member having a light transmission factor which varies in response to electrode control signals and including a light transmitting characteristic part and a light shielding characteristic part, both of which parts are determined by the value of said light transmission factor; and
  (4) a plurality of electrodes disposed on said first transparent base plate to confront said physical property member and for providing said electrode control signals, said electrode having areas which are determined so that the stop aperture varies in accordance with the equal multiplicative sequence and aligning with the effective T number for each stopping step, wherein said stop aperture is defined by said light transmitting characteristic part of said physical property member, and the area of said stop aperture is determined in accordance with the value of said light transmission factor which determines said light transmitting characteristic part of said physical property member and the value of said light transmission factor which determines said light shielding characteristic part of said physical property member.

4. A stop device according to claim 3, wherein said device has an optical axis and each of said electrodes is of a circular shape which is concentric with said optical axis.

5. A camera stop device having an optical axis and a controllable stop aperture so that a quantity of light corresponding to an effective T number can be selected to pass through the device, comprising:
 (a) stop means for providing the stop aperture at each of a number of stopping steps, including:
  (1) a first transparent base plate;
  (2) a second transparent base plate;
  (3) a physical property member interposed between said first and said second transparent base plates; and
  (4) a plurality of electrodes disposed on at least one of said first and said second base plates, each of said electrodes being of a circular shape which is concentric with said optical axis, said electrodes confronting said physical property member to provide said electrode control signals, said electrodes having areas which are determined so that the stop aperture varies in accordance with the effective T number for each stopping step which aligns in the equal multiplicative sequence, wherein said stop aperture is defined by said light transmitting characteristic part of said physical property member, the area of said stop aperture is determined in accordance with the value of said light transmission factor which determines said light transmitting characteristic part of said physical property member and the value of said light transmission factor which determines said light shielding characteristic part of said physical property member, the area of each of said electrodes being determined on the basis of the following formula:

$$Sn + 1 = \tfrac{1}{2}\left(Sn - \frac{\alpha_{OP}}{\alpha_{TR} - \alpha_{OP}} \cdot S_o\right)$$

wherein $S_o$ represents the area of the light transmitting part when the aperture is fully open; $Sn$ and $Sn+1$ representing the areas of the light transmitting part for adjoining stopping steps; $\alpha_{TR}$ represents the light transmission factor of the light transmitting part of said physical member; and $\alpha_{OP}$ represents the light transmission factor of the light shielding part of the physical property member.

* * * * *